United States Patent [19]

Valencia

[11] 4,387,972

[45] Jun. 14, 1983

[54] MICROSCOPE SLIDE WITH CONFIRMING WELLS

[75] Inventor: Donald W. Valencia, El Dorado Hills, Calif.

[73] Assignee: Immuno Concepts, Inc., Sacramento, Calif.

[21] Appl. No.: 238,472

[22] Filed: Feb. 26, 1981

[51] Int. Cl.³ .............................................. G02B 21/34
[52] U.S. Cl. ...................................... 350/536; 356/244
[58] Field of Search .................. 350/95; 356/244, 246

[56] References Cited

U.S. PATENT DOCUMENTS 2,041,290  5/1936  Jackson ........................... 350/95 X
2,302,830  11/1942  Axelrad ............................... 350/95

*Primary Examiner*—John K. Corbin
*Assistant Examiner*—Matthew W. Koren

*Attorney, Agent, or Firm*—Fulwider, Patton, Rieber, Lee & Utecht

[57] ABSTRACT

A transparent microscope slide for the diagnostic analysis of liquid specimens, the slide having on one surface a plurality of specimen retaining areas defined by a first boundary forming a test well and a second boundary forming a channel outside the first boundary. The channel, or confirming well, acts as a moat by retaining specimen liquid overflowing from the test well, yet does not interfere with microscopic analysis. The well can have a circular or square configuration, and the channel can have a square or circular ring configuration and be concentric with the well. The size of the wells can vary depending upon the particular liquid specimen analyzed and the diagnostic procedure utilized without interfering with the efficacy of the confirming wells.

9 Claims, 3 Drawing Figures

MICROSCOPE SLIDE WITH CONFIRMING WELLS

BACKGROUND OF THE INVENTION

This invention relates generally to the microscopic examination of liquid specimens, and, more particularly, to an improved microscope slide having wells for holding a specimen during preparations prior to microscopic examination.

In serologic and other diagnostic procedures requiring the microscopic examination of liquid specimens, such as blood, urine, spinal fluid, sputum or cell cultures, the customary practice has been to place a small drop of the specimen to be analyzed in a well on a flat transparent microscope slide. Depending on the particular diagnostic procedure being performed, various substrates may be incorporated on the slide, prior to the addition of the drop, to initiate chemical reactions detectable in accordance with standard diagnostic procedures. Alternatively, substrates may be added to the drop after placing the drop on the glass plate. In either case, this reaction with the substrate frequently requires an incubation time of ten to thirty minutes or more, and the time liquid is in the well can be substantially increased by additional processing of the specimen in preparation for microscopic analysis. During this total time, the liquid specimen can spread throughout the entire well, and if an excess amount of specimen or substrate is present, or if the slide is accidentally bumped, the specimen liquid can spill outside the well. Since slides usually contain more than one well, this spillage can cause cross-contamination between the various liquid specimens and can adversely affect the accuracy of the subsequent microscopic examination.

Efforts have been made to obviate these problems of cross-contamination by providing deeper wells, but the experience with such wells has been less than completely satisfactory, primarily because the deep wells often induce focusing problems that hinder clear microscopic resolution. Also, providing wells much larger than required for the amount of liquid specimen present is inadvisable because some diagnostic procedures, e.g., staining, require a relatively even distribution of the liquid specimen throughout the entire well. Thus, there is a recognized need for a liquid specimen slide which will reduce the chances of cross-contamination in multiple-welled slides, yet not induce focusing or other problems. The present invention fulfills this need.

SUMMARY OF THE INVENTION

The present invention resides in an improved microscope slide having structurally defined areas for retaining liquid specimens that significantly reduce the likelihood of cross-contamination between specimens during preparation for microscopic analysis, in comparison to prior art slides. Moreover, the slide construction of the present invention is relatively inexpensive to manufacture, can be effectively utilized in a large variety of diagnostic procedures, and attains its improved results without introducing microscope focusing problems.

In accordance with the invention and as embodied in a preferred embodiment shown herein for purposes of illustration, the improved slide has on one surface a plurality of structurally defined retaining areas for liquid specimens. An area is defined by a first boundary forming a well and by a second boundary forming a channel outside said first boundary. The channel, which can act as a moat, substantially reduces the chance of separate liquid specimens intermixing during incubations and processing prior to microscopic examination.

Alternatively, the microscope slide provided can be viewed as comprising a thin flat plate having on one surface at least one test well for holding a liquid specimen, and a confirming well outside the test well. When the test well is of circular or square configuration, the confirming well should have a circular or square ring configuration, respectively, for better liquid retention, i.e., retention by the confirming well of any liquid overflowing the test well.

For ease in manufacturing, the slide should be made of glass, and the boundaries defined by silkscreen imprints on the glass. The boundaries can thus easily be made into a variety of configurations, but preferably the boundary configurations are circular and concentric. When concentric circles are utilized, the diameter of the well formed by the first (inner) boundary can vary from about 2/32 to 20/32 inches and the width of the channel formed by the second (outer) boundary can vary from about 1/64 to 4/32 inches. Preferred widths range from about 5/32 to 7/32 inches for the well diameter, and from about 1/32 to 2/32 inches for the channel width.

Other aspects and advantages of the invention will be apparent from the following detailed description, taken in conjunction with the accompanying drawings.

DETAILED DESCRIPTION OF THE INVENTION

Figure 1:
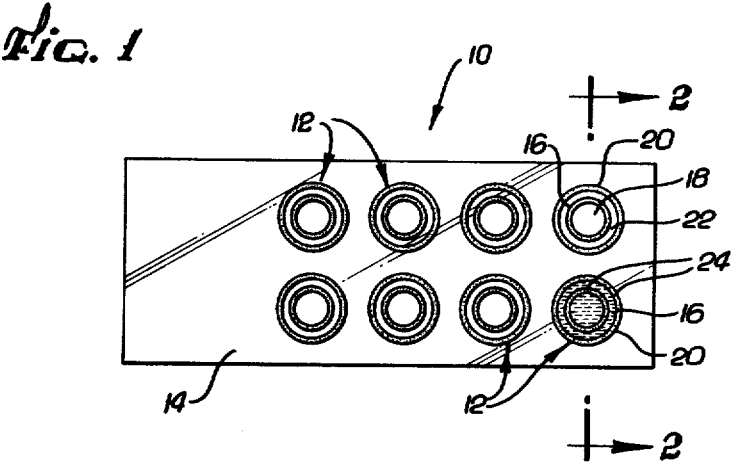
FIG. 1 is a top plan view of a slide having a plurality of structurally defined areas embodying the novel features of the present invention.

As shown in the exemplary drawings, the present invention is embodied in an improved slide 10 formed as an elongated rectangular glass plate, and having a plurality of structurally defined retaining areas 12 spaced apart longitudinally in two rows on one surface 14 of the plate. In typical use, a drop of liquid specimen is placed in each of the eight defined areas. Then, if necessary, substrates are added, and the specimen-substrate mixture is allowed to incubate for the required time period, which will vary according to the specific diagnostic procedures employed. A thin transparent overslip is then pressed gently over the slide, and the entire coverslip-slide combination placed under a microscope for visual examination.

In accordance with the present invention, each retaining area 12 is defined by a first boundary 16 forming a test well 18, and a second boundary 20 forming a channel 22. Acting as a moat, the channel 22 will confine any liquid spilling from the test well 18 within the retaining area 12, thus substantially reducing the likelihood of cross-contamination among the separate liquid specimens on the slide. Further, the retaining area 12 of this invention is relatively inexpensive to manufacture, can be easily modified to accommodate numerous types of liquid specimens requiring varying well sizes, and does not introduce microscope focusing problems.

Figure 3:
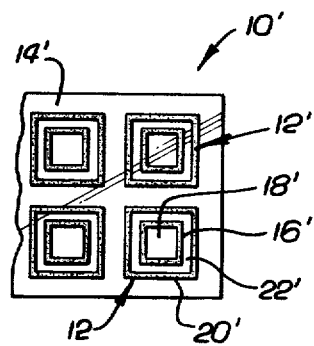
FIG. 3 is a fragmentary top plan view of a slide illustrating an alternative embodiment of the present invention.

Different shapes may be used for the defined retaining areas 12. The test well 18 is shown herein in a commn shape, which is circular. Similarly, the channel 22 is shown herein as a circular ring concentric with the well 18. This concentricity helps to demarcate and highlight the end of the well along its entire circumference, allowing for easier visual examination of the specimen. Alternatively, as shown in FIG. 3, the slide 10', with retaining areas 12' on a slide surface 14', may have a first boundary 16' defining a square well 18' and a second boundary 20' defining a concentric square channel 22'. These square configurations could facilitate the use of automatic scanning microscopes.

While the slide 10 may be formed of various compositions, preferably it is made of glass. The boundaries 16 and 20 may be printed on the glass slide by well known silk-screening techniques. To provide distinct test wells and channels when examined under a microscope, the boundaries 16 and 20 should not be so irregular as to trap along the edges of the wells 18 and channels 18 any particulate matter in the liquid specimens.

Primary considerations in determining the width of the wells 18 are the type of liquid specimen under analysis as well as the particular diagnostic procedure utilized. The width of the channels 22 will generally vary concomitantly with the width of the wells 18. When the diameter of the well 18 ranges from about 2/32 inches to 20/32 inches, the width of the channel 22 should be from about 1/64 inches to 4/32 inches. Preferably, the well 18 has a diameter from about 5/32 to 7/32 inches and the width of the channel 22 is from about 1/32 to 2/32 inches.

When the retaining areas 12 are defined by silk-screen imprints on the glass slide, it is well known in the art that care must be taken to avoid making the wells 18 too deep. Otherwise, microscope focusing problems may arise. Additionally, for similar reasons, the depth of the channels 22 should substantially correspond to the depth of the wells 18. Large divergences from this uniformity could induce instability in the coverslip after its placement on the slide, again potentially interfering with the accuracy of the microscopic analysis.

Figure 2:
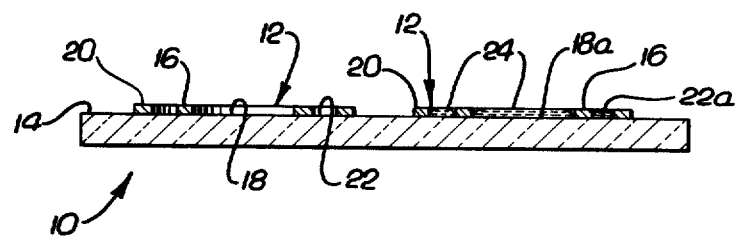
FIG. 2 is an enlarged cross-sectional view of the slide taken substantially along line 2—2 of FIG. 1.

As shown in FIG. 2, a cross-sectional view of the slide 10 illustrates the substantially uniform depth of the wells 18 and channels 22 as defined by the first boundary 16 and the secondary boundary 20, respectively. The well 18 adjacent the right side of the slide in FIG. 2 is shown with a liquid specimen 24 that has spilled over into, and has been retained by, the channel 22.

From the foregoing, it will be appreciated that the microscope slide of the present invention allows for improved analysis of numerous liquid specimens on one slide by minimizing the likelihood of intermixing of the specimens. This is achieved in an inexpensive yet effective manner by providing a liquid specimen retaining area comprising a test well 18 and a confirming well 22, which is positioned outside the test well to catch any portion of the liquid specimen overflowing from the test well. Importantly, the confirming well 22 does not introduce difficulties into the microscopic analysis.

While a particular form of the invention has been illustrated and described, it will be apparent that various modifications can be made without departing from the spirit and scope of the invention.

I claim:

1. A microscope slide for use in diagnostic procedures of liquid specimens, said slide comprising a substantially flat base layer and a substantially flat overlay layer adhered thereto and having on one surface at least one structurally defined area for retaining liquid specimens during preparation for subsequent microscopic analysis, said area having a first boundary forming a well with a flat bottom defined by a surface of the base layer, and a second boundary forming a channel outside said first boundary, each of said boundaries being formed by the edges of openings through said overlay layer, whereby fluid spilled from said well during specimen preparation is retained in said channel.

2. The microscope slide of claim 1 wherein said overlay layer is of a different material than said base layer.

3. The microscope slide of claim 1 wherein said overlay layer is thinner than said base layer.

4. The microscope slide of claim 1 wherein said first and second boundaries are concentric and have circular configurations.

5. The microscope slide of claim 1 wherein said overlay layer is opaque.

6. The microscope slide of claim 1 wherein a plurality of wells are present on the slide.

7. The microscope slide of claim 1 wherein said first boundary and said second boundary have a square configuration.

8. The microscope slide of claim 1 wherein the depths of the well and channel are substantially uniform.

9. The microscope slide of claim 1 wherein said slide is composed of glass and said first and second boundaries are defined by a silk screen imprint on a surface of the glass.

* * * * *